United States Patent
Wallack et al.

(10) Patent No.: US 7,965,887 B2
(45) Date of Patent: Jun. 21, 2011

(54) METHOD OF PATTERN LOCATION USING COLOR IMAGE DATA

(75) Inventors: Aaron S. Wallack, Natick, MA (US); David Michael, Wayland, MA (US)

(73) Assignee: Cognex Technology and Investment Corp., Mt. View, CA (US)

( * ) Notice: Subject to any disclaimer, the term of this patent is extended or adjusted under 35 U.S.C. 154(b) by 986 days.

(21) Appl. No.: 11/292,170

(22) Filed: Dec. 1, 2005

(65) Prior Publication Data
US 2009/0141973 A1    Jun. 4, 2009

(51) Int. Cl.
*G06K 9/00* (2006.01)

(52) U.S. Cl. ............... 382/165; 382/162; 382/181

(58) Field of Classification Search .......... 382/165, 382/190, 170, 181
See application file for complete search history.

(56) References Cited

U.S. PATENT DOCUMENTS

| | | | |
|---|---|---|---|
| 4,685,071 A | 8/1987 | Lee | |
| 5,265,173 A * | 11/1993 | Griffin et al. | 382/103 |
| 5,359,185 A | 10/1994 | Hanson | |
| 5,420,712 A | 5/1995 | Maeda et al. | |
| 5,548,326 A | 8/1996 | Michael | |
| 5,583,954 A | 12/1996 | Garakani | |
| 5,640,200 A | 6/1997 | Michael | |
| 5,714,745 A | 2/1998 | Ju et al. | |
| 5,751,853 A | 5/1998 | Michael | |
| 5,799,105 A * | 8/1998 | Tao | 382/167 |
| 5,960,125 A * | 9/1999 | Michael et al. | 382/294 |
| 6,123,261 A | 9/2000 | Roustaei | |
| 6,137,893 A * | 10/2000 | Michael et al. | 382/103 |
| 6,141,033 A | 10/2000 | Michael et al. | |
| 6,519,362 B1 | 2/2003 | Cusmariu | |
| 6,556,313 B1 | 4/2003 | Chang et al. | |
| 6,556,932 B1 | 4/2003 | Lingappa et al. | |
| 6,563,324 B1 | 5/2003 | Nichani | |
| 6,608,925 B1 | 8/2003 | Edge et al. | |
| 6,633,407 B1 | 10/2003 | Kim et al. | |
| 6,640,008 B1 * | 10/2003 | Lee et al. | 382/218 |
| 6,654,055 B1 | 11/2003 | Park et al. | |
| 6,809,714 B1 | 10/2004 | Yamauchi et al. | |
| 6,831,948 B1 | 12/2004 | Van Dijk et al. | |
| 6,834,807 B2 | 12/2004 | Ehrhart et al. | |
| 6,850,646 B1 | 2/2005 | Silver et al. | |
| 6,963,425 B1 * | 11/2005 | Nair et al. | 358/1.9 |
| 6,970,608 B1 * | 11/2005 | Michael | 382/299 |
| 6,970,808 B2 | 11/2005 | Abhulimen et al. | |
| 6,976,629 B2 | 12/2005 | Carlson | |
| 7,025,271 B2 | 4/2006 | Dvorkis et al. | |
| 7,028,901 B2 | 4/2006 | Carlson | |

(Continued)

FOREIGN PATENT DOCUMENTS
DE    10134974    7/2001
(Continued)

OTHER PUBLICATIONS
"Alignment Tools", *Cognex MVS-8000 Series CVL Vision Tools Guide*, Cognex Corporation,(2003),417-528.

(Continued)

*Primary Examiner* — Samir A Ahmed
*Assistant Examiner* — Li Liu (57) ABSTRACT

Machine vision tools are applied to color images using methods that utilize an optimized spectrum of the color information. Such methods include full color normalized correlation techniques and methods to convert color images to greyscale using weighting factors that maximize color contrast in a corresponding greyscale image.

12 Claims, 4 Drawing Sheets

U.S. PATENT DOCUMENTS

| | | | |
|---|---|---|---|
| 7,163,149 B2 | 1/2007 | He et al. | |
| 7,308,112 B2* | 12/2007 | Fujimura et al. | 382/103 |
| 7,617,984 B2 | 11/2009 | Nunnink | |
| 7,823,783 B2 | 11/2010 | Gerst et al. | |
| 7,823,789 B2 | 11/2010 | Nunnink | |
| 2002/0041705 A1* | 4/2002 | Lin et al. | 382/165 |
| 2002/0063719 A1 | 5/2002 | Ziobro | |
| 2002/0081022 A1* | 6/2002 | Bhaskar | 382/162 |
| 2002/0090132 A1* | 7/2002 | Boncyk et al. | 382/154 |
| 2003/0062413 A1 | 4/2003 | Gardiner et al. | |
| 2003/0174891 A1* | 9/2003 | Wenzel et al. | 382/209 |
| 2004/0037467 A1* | 2/2004 | Wenzel et al. | 382/203 |
| 2004/0257619 A1 | 12/2004 | Loce et al. | |
| 2005/0011956 A1 | 1/2005 | Carlson | |
| 2005/0196018 A1* | 9/2005 | Toyama | 382/103 |
| 2005/0207641 A1 | 9/2005 | Bala et al. | |
| 2006/0008151 A1* | 1/2006 | Lin et al. | 382/190 |
| 2006/0065619 A1 | 3/2006 | Warren et al. | |
| 2006/0072158 A1 | 4/2006 | Christie | |
| 2007/0090193 A1 | 4/2007 | Nunnink et al. | |
| 2007/0091332 A1 | 4/2007 | Nunnink | |

FOREIGN PATENT DOCUMENTS

| | | |
|---|---|---|
| DE | 10040563 | 2/2002 |
| EP | 0516927 | 3/1992 |
| JP | 9-62831 | 3/1997 |
| JP | 2002123791 | 4/2002 |
| WO | WO 98/52349 | 11/1998 |
| WO | WO 01/13326 A2 | 2/2001 |
| WO | 0217216 | 2/2002 |
| WO | 02075637 | 9/2002 |
| WO | 2005043449 | 5/2005 |

OTHER PUBLICATIONS

"Classifier Tool", *Cognex Checkpoint II Tools Guide*, Cognex Corporation,(2001),243-248.

"Work with Color Images", *VisionPro 3.5 How-To, Cognex Corporation*, VisionPro System Help Files,(2004).

Comer, Mary L., et al., "Morphological Operations for COlor Image Processing", *Journal of Electronic Imaging*, vol. 8, No. 3, (Jul. 1999) ,279-289.

Rehrmann, Volker, et al., "Fast and Robust Segmentation of Natural Color Scenes", *Proceedings of the Third Asian Conference on Computer Vision*, (1998).

Template Matching, Chapter 8, pp. 321-349 (XP007901808), "Pattern Recognition, Second Edition" by S. Theodoridis, 2003.

PCT Search Report, PCT/US2006/046015, 2007.

PCT Search Report, PCT/US2006/041045, Oct. 19, 2006.

\* cited by examiner

METHOD OF PATTERN LOCATION USING COLOR IMAGE DATA

BACKGROUND OF THE INVENTION

This invention relates to machine vision analysis of images, and specifically, to methods for finding an object in an image using color images.

Machine vision is a term that generally refers to computer-based analysis of images to provide visual sensory input to industrial processes, such as inspection, automated handling, and process control. Machine vision is performed through the application of digital image processing software on image data acquired by digital imaging equipment, such as CMOS or CCD cameras.

Digital image processing typically includes numerous computations to locate and assess characteristics of image features, including comparisons to known models. Methods for performing such a comparison are generally referred to as pattern location.

One commonly used rudimentary method for pattern location is generally known as blob analysis. In this method, the pixels of a digital image are classified as "object" or "background" using conventionally known segmentation methods to provide a 1-bit monochrome image. Connectivity analysis is performed to group neighboring object pixels, and certain properties can be determined from the grouped regions. These properties, including position, can be compared to a known ideal to determine a location in the image.

An improved pattern location method that has attained widespread use in machine vision applications is normalized correlation. In this method, the full range of greylevels are considered, and a match score is the correlation coefficient between the model and the subset of the image at a given position. The location of the model in the image resulting in the best match score determines a location in the image. Rotation and scale variations can be accommodated by digitally resampling the model at various rotations and scale, then running a normalized correlation.

Geometric pattern matching is a pattern location method used in machine vision that can provide extremely accurate pattern location at sub-pixel resolutions independent of rotation and scale. The model is created from a training image to create feature-based descriptions that can be translated, rotated, and scaled to arbitrary precision much faster than digital image resampling and without pixel grid quantization errors.

Machine vision has been performed traditionally on greyscale images acquired by monochrome, or greyscale cameras. Widespread availability of low-cost greyscale cameras, with the computationally efficient processing of a single channel 8-bit image data has been proven effective in most industrial machine vision applications.

Color image data processing dramatically increases the complexity of machine vision operations. Instead of a single channel 8-bit image data set in a greyscale image, a color image is composed of at least three channels of the image intensity levels for each of the three primary color planes, i.e., RGB (red, green, blue). A full color image is composed of an 8-bit image for each color channel, resulting in a 24-bit image data set.

Industrial grade color digital cameras traditionally employed the use of three greyscale image sensors with a prismatic optical component to produce an image data set for each of the RGB (red, green, ble) components. Current trends in the digital imaging industry are resulting in the availability of lower-cost single-chip color image sensors.

Most machine vision software processing tools can not directly process a multi-channel color image. A conversion process or compression algorithm is necessary to reduce the run-time image to an 8-bit greyscale image. This is commonly performed by processing only one of the three channels of a color image, or linearly combining, or averaging, the intensity of the three color planes into a single greyscale image.

Accordingly, there is a need for a methodology for adapting machine vision tools to provide the capability for performing image data processing on full color spectrum without losing image data by compressing multiple channel color images into greyscale images.

BRIEF SUMMARY OF THE INVENTION

The invention provides a general method for locating a pattern of an object in a color image. In a particular embodiment, the invention uses color information from a color model image of an expected pattern to determine a pose having at least one non-translational degree of freedom of the expected pattern in a color run-time image of the pattern.

In an illustrative embodiment, a greyscale image of the color model image and the color run-time image is computed using a dynamic weighting method that maximizes the color contrast as represented in the color image, followed by pattern matching method that determines a pose having at least one non-translational degree of freedom.

In an alternative illustrative embodiment, the pose having at least one non-translational degree of freedom is used in a color analysis of the color run-time image.

BRIEF DESCRIPTION OF THE DRAWINGS

The above and further advantages of the invention may be better understood from the following detailed description, in conjunction with the following figures, referred to herein and constituting a part hereof, wherein.

DETAILED DESCRIPTION OF THE INVENTION

Figure 1:
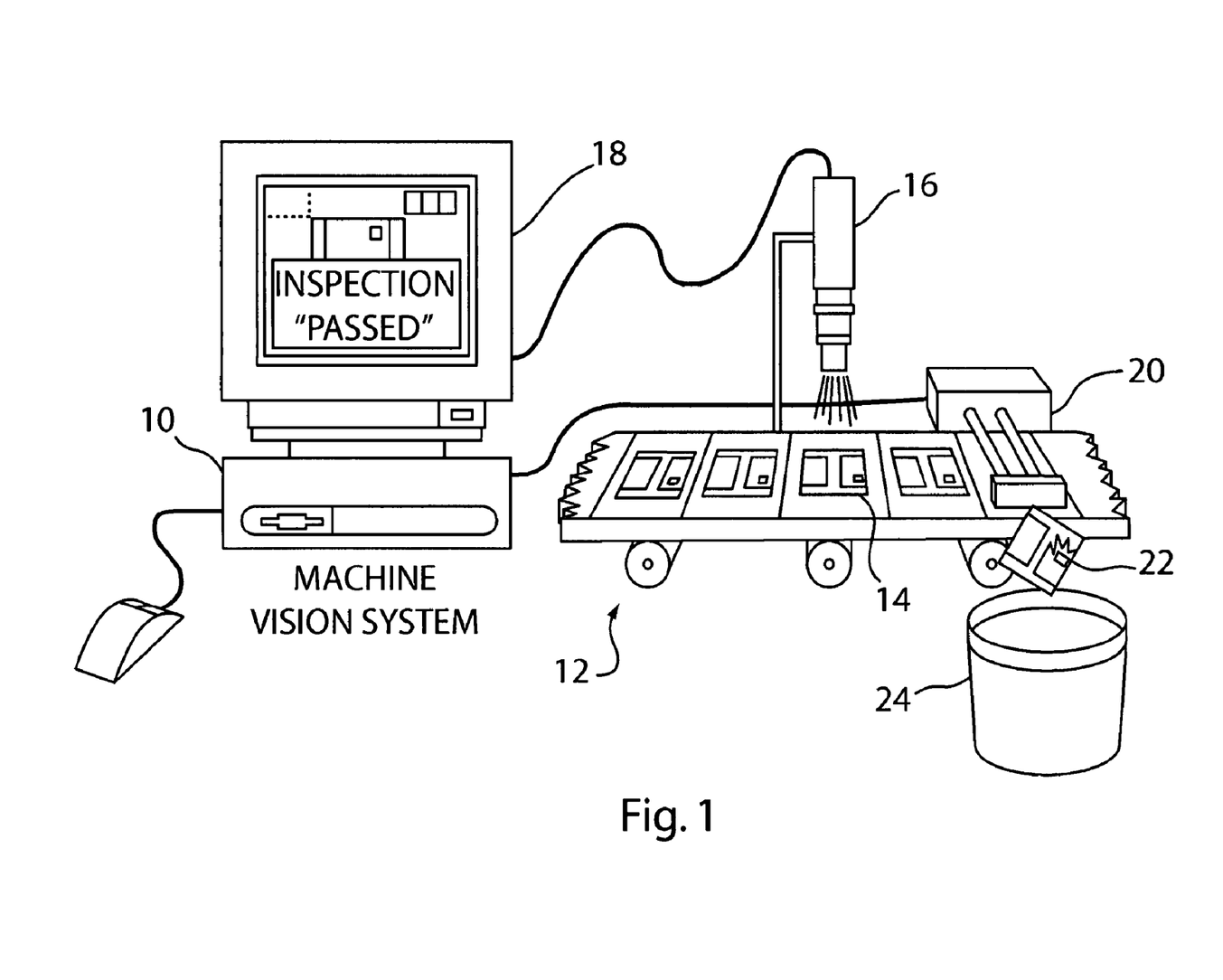
FIG. 1 depicts an illustrative machine vision industrial application according to the background art.

FIG. 1 depicts an illustrative machine vision industrial application adapted to perform methods of pattern location according to the present invention.

Pattern location is a common machine vision process used for inspection, alignment and registration, and as an initial subprocess to more complex machine vision analysis processes. Pattern location requires training the system with a model during a set-up or configuration phase, followed at run-time by finding the model in the image.

Referring to FIG. 1, in accordance with the present invention, there is provided a visual inspection system that can be employed by, for example a machine vision for aid in making decisions and providing information about objects in an inspection process such as commonly occur in automated industrial manufacturing. For example, the visual inspection system can be employed in a machine vision system 10 for a manufacturing line such as manufacturing line 12, as shown in FIG. 1. Using the inspection system, sample-objects 14 can be inspected for compliance with metrics such as size, shape, or the presence of defective characteristics such as scratches, stains, or extraneous printing.

Camera 16, which is, for example, a color CMOS camera, acquires a color image of the sample-object 14. The color image is transferred to the machine vision system 10 where machine vision processes are performed on the image to determine an inspection result. The machine vision system 10 can include a display monitor 18 or other means for displaying the acquired sample-object image to a manufacturing line operator. After determining the inspection result of the sample-object 14 under inspection, the machine vision system can provide information about the sample-object position, geometry, size, or other characteristics.

The machine vision system 10 may, for example, determine if the sample-object under inspection meets quality control standards with regard to size, or inspection features, etc. These standards can be "taught" to the vision system during a training mode, by way of producing training templates from examples of sample-objects that meet any established visual inspection quality criteria. The machine vision system 10 can then compare a sample-object under inspection against its pre-trained templates during run-time mode, in some manner, to determine if the sample-object satisfies the inspection criteria.

In this regard, it should be appreciated that the pattern location process provided in the systems and methods designed in accordance with the exemplary embodiment may be used to provide training mode sample-object image-data. Therefore, the pattern location process may be performed as part of the training process wherein, templates or models are created. It is foreseeable that, during the training mode, the machine vision system may work in cooperation with a line operator or other individual to produce training templates. However, it should be understood that the machine vision system 10 might also perform automated training template production.

Additionally, the pattern location process may be performed as part of the run-time inspection mode, in which a sample-object currently under inspection is compared with a sample-object template or model. It should also be appreciated that, during run-time, the machine vision system 10 may work as an automated system, with little or no control necessary by a line operator. However, it should be appreciated that, during run-time, the machine vision system 10 may interact with a line operator so as to allow the line operator to control any or all of timing of acquiring the sample-object image, adjustment of alignment data and subsequent determination of whether the generated inspection results are acceptable.

During run-time, if the vision system 10 ascertains that the sample-object under inspection satisfies inspection standards, an indication of such a condition can be provided on the display 18 as, e.g., the word "PASSED," or can be provided to an operator or automatic indicator on the assembly line in another fashion such as recording into a data log. Alternatively, no indication other than the continuation of the sample-object to later stages of an assembly process may be provided. If the vision system 10 ascertains that a sample-object under inspection does not meet the standard, a mechanical diverter 20 as shown in FIG. 1, connected to the vision system, can be signaled to remove a faulty sample-object 22 from the line when the faulty sample-object 22 is conveyed to the location of the diverter 20. The diverter 20 might move the faulty sample-object off of the line and into, for example, a storage receptor 24 for rejected sample-objects. As will be recognized by those skilled in the art, many alternative object inspection and manipulation functions can be provided in a manufacturing line system like that of FIG. 1.

A digital image is a discrete two-dimensional function I(x,y), where the value of the function at each point (x,y) represents an image intensity value. In most machine vision applications, the image is a greyscale image, and the intensity of each point is one of a range of quantized 8-bit values, i.e., 0-255. One skilled in the art will appreciate that machine vision applications can also use other quantized values, such as 10-bit, 12-bit, or 16-bit values. Each point (x,y) in the image I(x,y) is typically called a pixel.

A model, or template, is similar to an image, though it can be represented as a discontinuous collection of regions. The model is a discrete two-dimensional function M(x,y) where the value of the function at each point (x,y) represents a grey level intensity value. A mask can be optionally applied to the model to assign a "don't care" value to portions of the model that are not within the discontinuous collection of regions—however, the "don't care" value is not the same as a zero grey level.

Pattern location processes, known as "template matching" or "pattern matching" find the location of a pattern from a model image in the run-time image. Pattern matching methods can tolerate extraneous objects, or partially occluded objects, as well as various forms of image degradation and lighting variations. Common pattern matching methods known in the art are normalized correlation and geometric pattern matching.

Normalized correlation is a pattern matching method that scans the run-time image for a match to the model, and provides a position and orientation, along with a measurement of the correlation, or "score." Normalized correlation methods operate on a full range of greyscale values, and effects due to lighting variations are minimized by normalizing the intensity variations in the images. A match score N for normalized correlation of the model m to the image i, where n is the number of pixels, can be described as:

$$N = \frac{\left(n\sum im - \sum i \sum m\right)^2}{\left(n\sum i^2 - \left(\sum i\right)^2\right)\left(n\sum m^2 - \left(\sum m\right)^2\right)} \quad (1)$$

In Normalized correlation works well to determine the location of objects that are translated, though only small variations in angular orientation and size can be tolerated. Normalized correlation can be used to determine a pose having a translational degree of freedom. If the pattern in the model image deviates by more than a few degrees in orientation, or varies in size or scale by more than a few percent in the run-time image, normalized correlation is not effective. Rotation-Scale Invariant (RSI) search methods have been developed to improve the robustness of the pattern matching methods as these methods can be used to find a pose having at least one non-translational degree of freedom.

RSI search methods rotate and scale the model by digital image resampling of the model image, and performing sequential normalized correlation searches using the rotated and scaled model. By matching over a range of angles, sized, and translational positions, a pattern matching can be performed in several degrees of freedom.

Geometric pattern matching methods use geometric feature matching to locate and determine the alignment of objects with variations in several degrees of freedom including translational and non-translational degrees of freedom. A feature detection algorithm is used to produce a geometric description of an object boundaries in the model image, as specified, for example, by a user, to produce a training pattern. The geometric description of the object can be a set of boundary points that lie along contours separating dissimilar regions in the image. Each boundary point specifies both position and orientation. In operation, feature extraction of the nin-time image produce boundary points that can be transformed by parameterized mathematical algorithms to produce translated, rotated, scaled, and stretched patterns. The pattern search of the training pattern is reduced to searches over the parameter values to provide a pose of the trained object, and a pattern match score.

Conventional machine vision pattern matching methods operate on a greyscale image, and color information, if available from a color image acquisition, is discarded or compressed through a conversion to greyscale. Using the method and apparatus of the present invention, a practical and effective method to perform machine vision pattern matching that includes the full spectrum of color information is provided.

Figure 2:
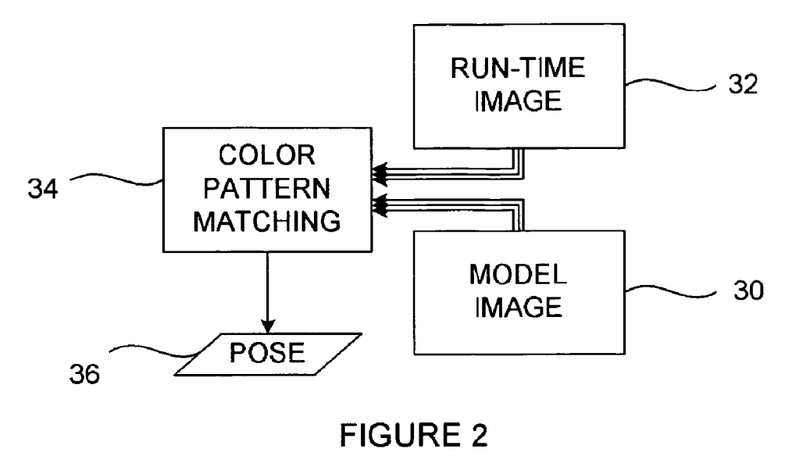
FIG. 2 depicts a flowchart of an embodiment of the present invention.

Referring to FIG. 2, a method for locating a pattern of an object in a color image is shown. A color model image 30 having a pattern is provided. The color model image 30 can be a conventional RGB image, or any multiple-channel image having a plurality of color channels, such as Cyan Magenta Yellow (CMY). A color run-time image 32 is provided, and the full color information from both the color run-time image 32 and the color model image 30 are directed to a color pattern matching step 34.

In an illustrative embodiment of the present invention, the color pattern matching step 34 is a full-color normalized correlation search. Each pixel of the color model image 30 and the color run-time image 32 is represented as a vector in color space, i.e., the color vector is composed of components from each color plane.

To perform a full color normalized correlation using a color model and a color image, let $\vec{I}$ be a vector representation of the three color channels of the image and $\vec{M}$ be a vector representation of the three color channels of the model. Each respective vector composed of the intensity of each color planes, e.g., $(i_r, i_g, i_b)$, $(m_r, m_g, m_b)$. The match score N for full color normalized correlation of the model in the image, where n is the number of pixels, can be described as:

$$N = \frac{\left(n\sum \vec{I} \cdot \vec{M} - \sum \vec{I} \cdot \sum \vec{M}\right)^2}{\left(n\sum \vec{I} \cdot \vec{I} - \sum \vec{I} \cdot \sum \vec{I}\right)\left(n\sum \vec{M} \cdot \vec{M} - \sum \vec{M} \cdot \sum \vec{M}\right)} \quad (2)$$

One of the reasons why normalized correlation is used is because it is invariant to uniform linear scaling and uniform linear offsets. This means that the color values of the run-time image 32 can, as a group, all be doubled and the normalized correlation score will remain the same; alternatively, the color values of a run-time image 32, as a group, could also be increased by constant values (k,k,k) without affecting the score. This means, for color analysis, that the overall intensity of the scene, or the saturation of the scene, can vary without affecting the score. In other words, two scenes which differ by overall intensity or saturation can have identical scores. Fortunately, the "optimal" uniform scale and offset values (which transformed the model image 30 color values to match the run-time image color values) can be extracted from the normalized correlation statistics. The uniform scale values correspond to the ratio of the variances between the run-time image color values and the model image color values. The uniform offset value corresponds to (after appropriately scaling the run-time image data by the aforementioned uniform scale) the difference between the run-time image color values and the training template image color values. These two measures can be used (in addition to the normalized correlation score) to select whether or not to admit a particular normalized correlation-based candidate.

A pose 36 having a position and a score or result of the pattern matching step can be determined from the position of the model image 30 in the run-time image 32 having the best numeric correlation value N.

In another illustrative embodiment of the present invention, the color pattern matching step 34 can be a full-color RSI search. Here, the color model image 30 is digitally re-sampled in a number of orientations and/or scaled sizes. Full color normalized correlation, as previously described, is performed, and the pose 36 having a position, scale, orientation, and a score or result of the pattern matching step 34 can be determined from the position, scale, and/or orientation of the color model image 30 in the color run-time image 32 having the best numeric correlation value N.

Figure 3:
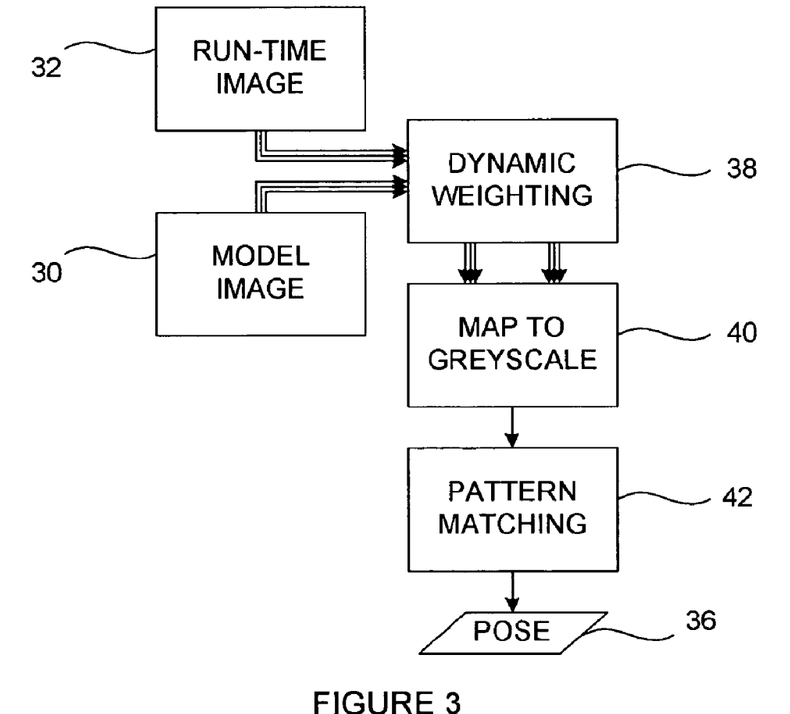
FIG. 3 depicts a flowchart of an alternate embodiment of the present invention.

An alternate illustrative embodiment of the present invention is shown in FIG. 3. The full color information from the color run-time image 32 and the color model image 30 are directed to a dynamic weighting step 38. Linear color scaling factors are computed, i.e., a dynamic weight, so that the greatest extent of the full color image information can be utilized when the respective color images are mapped to an equivalent greyscale image at map to greyscale step 40.

When converting a color image to greyscale, the image is compressed from a typical 24-bit data set to an 8-bit data set. If the compression method is a linear conversion of all three channels, or if only a single color channel is used to represent the greyscale image, the effectiveness of pattern matching techniques can be severely diminished. For example, if an object depicted in a full color image exhibits image intensity gradients due to shading and/or lighting variations, color contrast can be lost in the conversion. Certain intensities of green may map to an equivalent value for certain intensities of blue and/or red.

The dynamic weighting step 38 determines a scaling factor for each color plane by finding the scaling factors that maximize the variance of the color contrasts in the image so as to retain color contrast in a conversion to greyscale. In this illustrative embodiment of the invention, the dynamic weighting step 38 can be performed using the procedure described as follows.

An RGB image of either the color run-time image 32 or the color model image 30 is provided. A corresponding greyscale value can be computed in the map to greyscale step 40 as $I=\alpha i_r + \beta i_g + \gamma i_b + k$ where $\alpha$ is the scaling factor for the red channel, $\beta$ is the scaling factor for the green channel, $\gamma$ is the scaling factor for the blue channel, and k is a constant offset so that all of the resulting values are in the range 0-255 (for the purposes of clarity, the offset value will be ignored in this discussion).

The optimal scaling factors are computed by searching the space of $\alpha, \beta, \gamma$ and retaining the values which induce the highest variance of greylevels in the model template. In an embodiment of the present invention, the search for scaling factors is performed by searching over two angles $\theta_1$ and $\theta_2$. Each scaling factor is determined by:

$$\alpha = \cos(\theta_1) * \cos(\theta_2)$$

$$\beta = \sin(\theta_1) * \cos(\theta_2)$$

$$\gamma = \sin(\theta_2) \quad (3)$$

Initially, a coarse search is performed by using large step sizes for the factors (i.e., large step sizes for the angles $\theta_1$ and $\theta_2$), and find those that induce the highest variance, then reduce the step size until the optimal values are derived.

At each value for the scaling factors, the maximum variance in contrast can be determined by computing statistics about the image. The variance for each set of scaling factors can be determined by computing the difference between the sum of the squared intensity values over the number of pixels and the square of the sums of intensity values over the number of pixels squared.

Alternatively, the dynamic weighting step 38 can be computed to maximize contrast in a region of interest, or specific locations in the image, as describe in commonly owned U.S. Pat. No. 6,141,033, herein incorporated by reference.

Using the dynamic weights computed at step 38 for the color model image 30 and the color run-time image 32, a respective greyscale image is computed at the map to greyscale step 40, to provide a greyscale training image (mapped from the color model image) and a greyscale run-time image (from the color run-time image).

A pattern matching method 42 is performed using the greyscale training image and the greyscale run-time image from the map to greyscale step 40. Geometric pattern matching can be performed to provide a pose 36 including the position and score of the object in the run-time image, including the rotation, scale, and relative translation in position.

Figure 4:
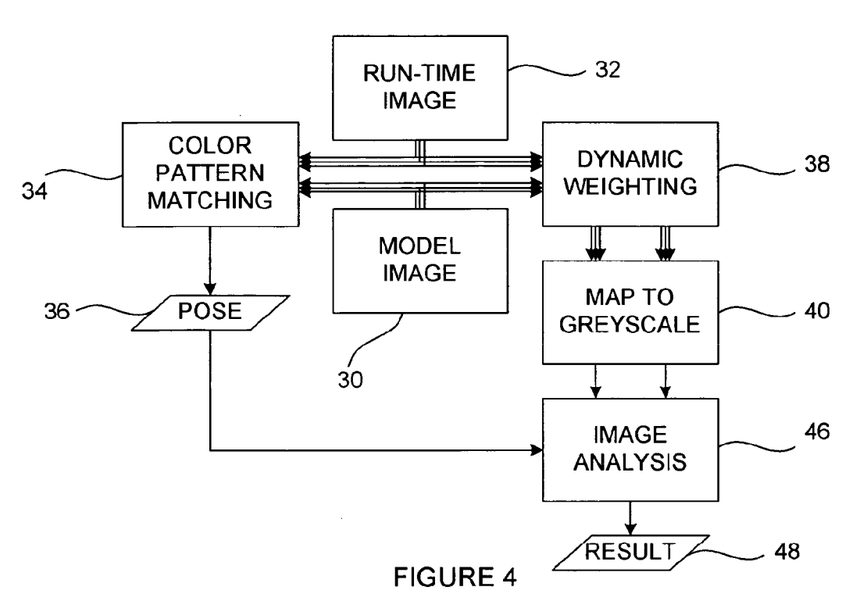
FIG. 4 depicts a flowchart of a second alternate embodiment of the present invention.

Referring to FIG. 4, there is shown a second alternate embodiment of the present invention. The color model image 30 and the color run-time image 32 are directed to the color pattern matching step 34, to determine a pose 36 having a score and position of the object model in the run-time image, as previously described in reference to FIG. 2.

The color run-time image 32 and the color model image are mapped to greyscale at step 40, preferably, though optionally, including a dynamic weighting step 38, as described above in reference to FIG. 3. At step 46, the pose 36 is used to perform an image analysis 46 of the greyscale run-time image to produce a result 48. The image analysis step 46 can include an inspection, or measurement of a feature. For example, if the color run-time image 32 is a scene of random colored spherical marbles, and the color model image is a green spherical marble, the color pattern matching step 34 will locate the pose of at least one green spherical marble in the color run-time image, and the image analysis step 46 can be a measurement of the size of the spherical marble, and/or an inspection for any surface defects and/or aberrations on the object.

Figure 5:
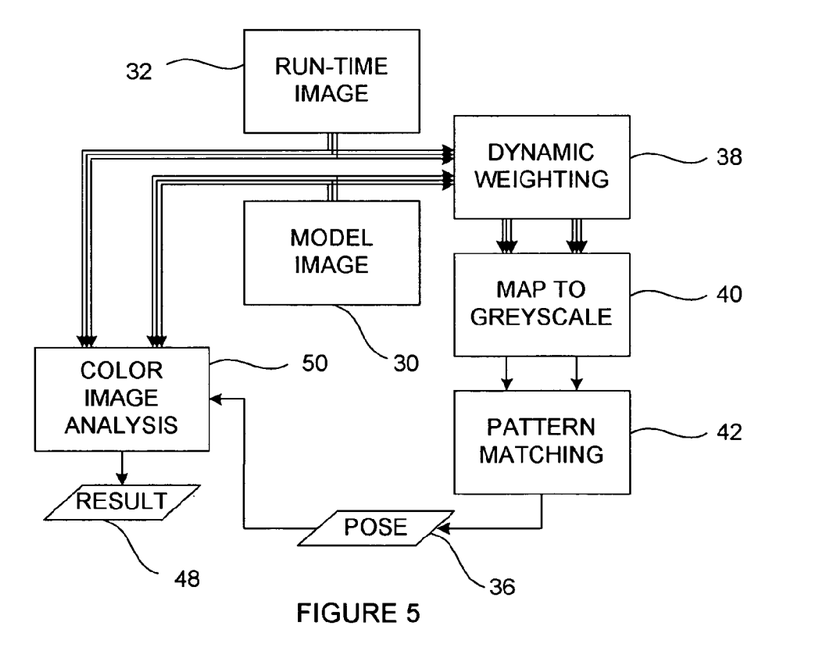
FIG. 5 depicts a flowchart of a third alternate embodiment of the present invention.

Referring to FIG. 5, there is shown a third alternate embodiment of the present invention. The color model image 30 and the color run-time image 32 are directed to the dynamic weighting step 38, followed by the map to greyscale step 40, and the pattern matching step 42 to produce a pose 36 of the model pattern in the run-time image, as described above in reference to FIG. 3. The color run-time image 32, the color model image 30, and the pose 36 are directed to a color image analysis step 50 to produce the result 48. In an illustrative example of this embodiment, the color analysis step 50 can be, for example, a color determination of a cube-shaped object in a scene of random colored spherical marbles.

Figure 6:
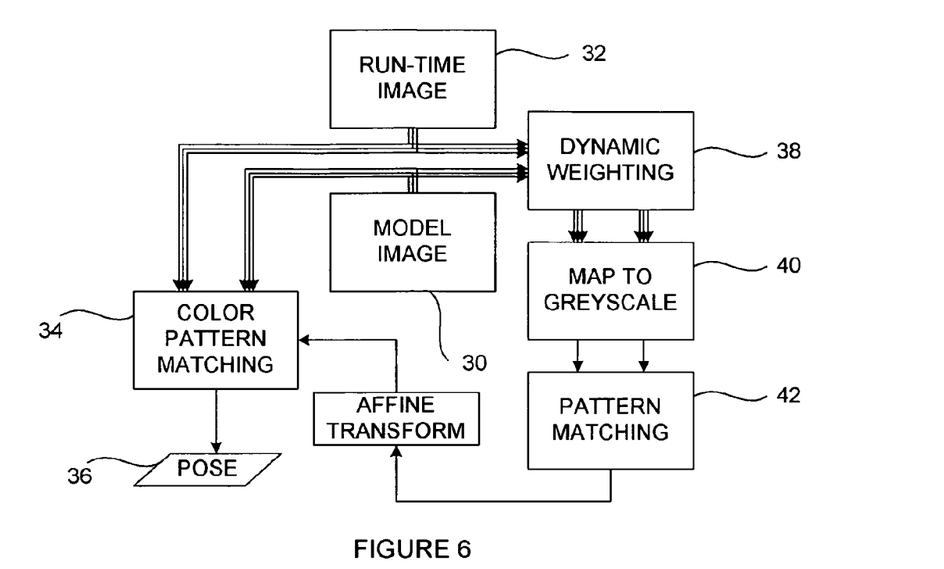
FIG. 6 depicts a flowchart of an illustrative example of the embodiment of the present invention according to FIG. 5.

An alternative illustrative example of the embodiment described in reference to FIG. 5 is shown in FIG. 6. The color model image 30 and the color run-time image 32 are directed to the dynamic weighting step 38, followed by the map to greyscale step 40, and the pattern matching step 42, as described above in reference to FIG. 3. Here, the pose of the model in the run-time image is used to perform an affine transformation 56 of the color model image 30 at the color pattern matching step 34. Since the pattern matching step 42 can provide the scale, orientation, and location of the object, the color model image 30 can be transformed using those parameters so that the color pattern matching step 34 can be more precise and efficient without having to resample the model image into various aspects of scale and orientation. The color image processing can compute a normalized correlation score which can verify that the candidate that matched using greylevels does in fact indeed have colors that match the model. This may be advantageous because patterns with different colors could have similar mapped greylevels. In some cases, for example, multiple greylevel candidates could be requested and found and then all such candidates could be verified using color image processing—such that only correct color matches are returned from the overall machine vision algorithm.

Figure 7:
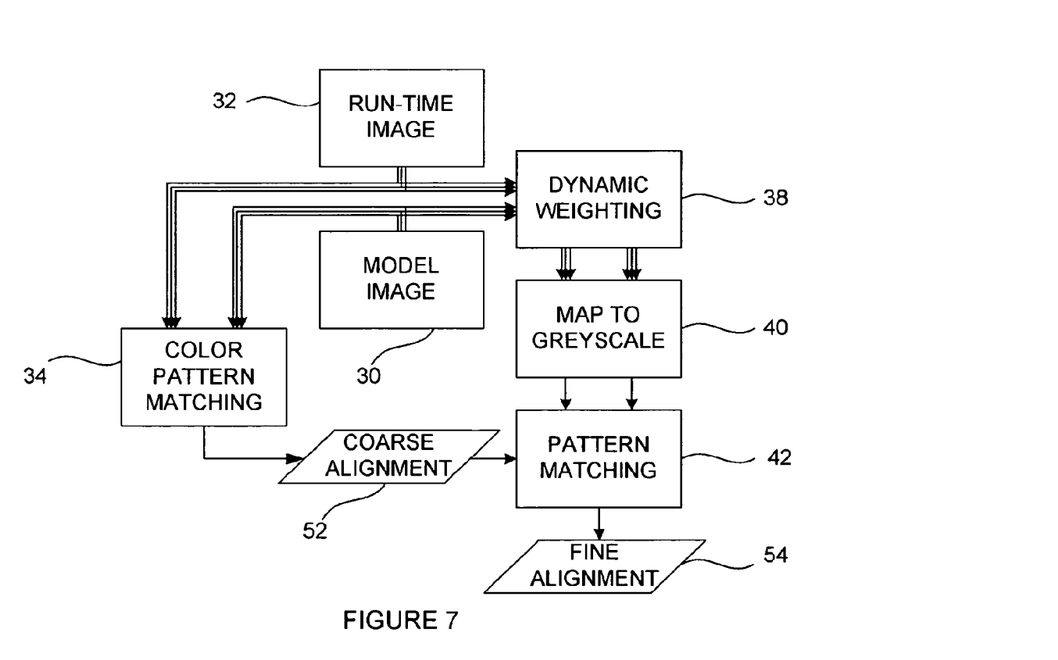
FIG. 7 depicts a flowchart of an alternative illustrative example of the embodiment of the present invention according to FIG. 4.

An alternative illustrative example of the embodiment described in reference to FIG. 4 is shown in FIG. 7. The color model image 30 and the color run-time image 32 are directed to the color pattern matching step 34. Here, full color normalized correlation or color RSI search can be performed to provide a pose or coarse alignment result 52. The color model image 30 and the color run-time image 32 are also directed to the dynamic weighting step 38, followed by the map to greyscale step 40, as described above in reference to FIG. 3. Here, the coarse alignment result 52 from the color pattern matching step 34 is used at the pattern matching step 42 to produce a fine alignment result 54. By reducing the search region in the pattern matching step 42 to the region identified by the coarse alignment result 52, the pattern matching step 42 can be more precise more efficient. The pattern matching step 42, in this illustrative example, is constrained to operate only on the features in the run-time image as determined by the color pattern matching step 34.

Other modifications and implementations will occur to those skilled in the art without departing from the spirit and the scope of the invention as claimed. Accordingly, the above description is not intended to limit the invention except as indicated in the following claims.

What is claimed is:

1. An apparatus comprising:
    a machine vision processor programmed to perform the steps of:
    obtaining a color model image of an expected pattern;
    obtaining a color run-time image including at least one instance of the pattern;
    computing a dynamic weight for each of a plurality of color channels in the color model image by calculating a weighting factor for each color channel and subsequently evaluating the weighting factors by computing a variance in contrast;
    computing a greyscale image of the color model image using the dynamic weights, and a greyscale image of the color run-time image using the dynamic weights; and
    using the greyscale image of the color model image to determine a pose having at least one non-translational degree of freedom of the expected pattern in the greyscale run-time image of the pattern.

2. The apparatus claim 1 wherein the machine vision processor is further programmed to perform the step of using color information from the color model image to determine a pose in the color run time image having at least one non-translational degree of freedom of the expected pattern, the step of using the greyscale image including analyzing the greyscale run-time image using the pose in the color run time image.

3. The apparatus claim 2 wherein the color model image and the color run-time image each comprises a plurality of color channels, and the step of determining a pose comprises computing a vector representation of each of the color model image and the color run-time image.

4. The apparatus claim 2 wherein the color model image and the color run-time image each comprises a plurality of color channels, and the step of determining a pose comprises computing a vector representation of each of the color model image and the color run-time image.

5. The apparatus claim 2 wherein the step of using color information from the color model image to determine the pose further comprises using vector-based normalized correlation.

6. The apparatus claim 1 wherein the machine vision processor is further programmed to perform the step of analyzing the color run-time image using the pose that was determined using the greyscale image of the color model image.

7. The apparatus of claim 6 wherein the step of analyzing the color run-time image using the pose further comprises:
performing an affine transformation of the color model image using the pose; and
using the color model image to locate an instance of the pattern of the object in the color run-time image.

8. The apparatus of claim 1 wherein the machine vision processor is programmed to perform step of computing a dynamic weight by, for each channel, selecting a weighting factor as a function of the magnitudes of several variance in contrast values associated with different weighting factors.

9. The apparatus of claim 8 wherein the step of computing a dynamic weight includes selecting weighting factors that result in a highest variance in contrast value associated.

10. An apparatus comprising:
a machine vision processor programmed to perform the steps of:
obtaining a first color image that includes an instance of an expected pattern;
generating a plurality of greyscale images using a plurality of different channel weighting factor sets that represent a search space;
evaluating the weighting factor sets by computing a variance in contrast for each of the weighting factor sets;
selecting the weighting factor set associated with the largest variance in contrast as a set of dynamic weights.

11. The apparatus of claim 10 wherein the processor is further programmed to perform the steps of receiving a color run time image and using the set of dynamic weights to convert a color run time image to a greyscale run time image.

12. The apparatus of claim 11 wherein the first color image is a color model image and the greyscale image corresponding to the color model image and the set of dynamic weights is a greyscale model image, the processor further programmed to perform the steps of using the greyscale model image to identify at least one pose of the expected pattern in the greyscale run time image.

* * * * *